(12) United States Patent
Im et al.

(10) Patent No.: US 11,059,435 B2
(45) Date of Patent: Jul. 13, 2021

(54) VEHICLE SOFTWARE CONTROL DEVICE

(71) Applicant: DRIMAES, INC., Daegu (KR)

(72) Inventors: Jin Woo Im, Daegu (KR); Guk Tae Kim, Daegu (KR); Won Lee, Daejeon (KR); Soo Yeon Kang, Seoul (KR); Young Moon Jung, Seoul (KR); Su Chang Ko, Seoul (KR); Kyung Hyun Lim, Daegu (KR); Hong Lee, Daegu (KR)

(73) Assignee: DRIMAES, INC., Daegu (KR)

(*) Notice: Subject to any disclaimer, the term of this patent is extended or adjusted under 35 U.S.C. 154(b) by 209 days.

(21) Appl. No.: 16/308,246

(22) PCT Filed: Nov. 30, 2018

(86) PCT No.: PCT/KR2018/015098
§ 371 (c)(1),
(2) Date: Dec. 7, 2018

(87) PCT Pub. No.: WO2020/059957
PCT Pub. Date: Mar. 26, 2020

(65) Prior Publication Data
US 2020/0290530 A1 Sep. 17, 2020

(30) Foreign Application Priority Data
Sep. 17, 2018 (KR) .................. 10-2018-0111097

(51) Int. Cl.
*G06F 3/00* (2006.01)
*B60R 16/023* (2006.01)
(Continued)

(52) U.S. Cl.
CPC .......... *B60R 16/023* (2013.01); *G06F 9/4401* (2013.01); *G06F 9/445* (2013.01); *G06F 9/455* (2013.01); *G06F 9/541* (2013.01)

(58) Field of Classification Search
CPC ........................................................ G06F 9/54
(Continued)

(56) References Cited

U.S. PATENT DOCUMENTS 5,379,431 A * 1/1995 Lemon .................. G06F 9/4401 710/10
6,438,745 B1 * 8/2002 Kanamaru .......... G06F 9/44521 717/137

(Continued)

FOREIGN PATENT DOCUMENTS

KR      101015573 B1    2/2011
KR   1020120062568 A    6/2012
(Continued)

OTHER PUBLICATIONS

Dr.rer.nat.habil, Operating System Components for an Embedded Linux System. (Year: 2007).*
(Continued)

*Primary Examiner* — Lechi Truong
(74) *Attorney, Agent, or Firm* — Meunier Carlin & Curfman LLC

(57) ABSTRACT

Disclosed is a vehicle software control device which includes hardware, a kernel connected to the hardware and configured to execute a first operating system, a system library connected to the kernel, a first connecting unit configured to connect a library for a second operating system different from the first operating system to the system library, and a first application executed on the second operating system.

3 Claims, 5 Drawing Sheets

(51) Int. Cl.
*G06F 9/4401* (2018.01)
*G06F 9/445* (2018.01)
*G06F 9/455* (2018.01)
*G06F 9/54* (2006.01)

(58) Field of Classification Search
USPC .................................................. 719/310, 319
See application file for complete search history.

(56) References Cited

U.S. PATENT DOCUMENTS

| | | | | |
|---|---|---|---|---|
| 7,707,578 B1* | 4/2010 | Zedlewski | ............ | G06F 9/5027 |
| | | | | 718/102 |
| 9,324,234 B2 | 4/2016 | Ricci et al. | | |
| 2003/0233385 A1* | 12/2003 | Srinivasa | ............ | H04L 67/1002 |
| | | | | 718/1 |
| 2005/0240941 A1* | 10/2005 | Hufferd | .................. | G06F 9/545 |
| | | | | 719/321 |
| 2005/0256976 A1* | 11/2005 | Susairaj | ............. | G06F 12/1081 |
| | | | | 710/3 |
| 2011/0252459 A1* | 10/2011 | Walsh | .................... | H04L 63/20 |
| | | | | 726/4 |
| 2013/0167159 A1* | 6/2013 | Ricci | .................... | G06F 3/0488 |
| | | | | 719/319 |
| 2015/0081986 A1* | 3/2015 | Chin | .................... | G06F 3/0673 |
| | | | | 711/154 |
| 2015/0301848 A1* | 10/2015 | Roehrig | ................ | G06F 9/4856 |
| | | | | 718/1 |
| 2016/0239334 A1* | 8/2016 | Yan | ........................ | G06F 11/323 |
| 2020/0213422 A1* | 7/2020 | Pandya | ............... | H04L 63/0236 |

FOREIGN PATENT DOCUMENTS

KR 101249735 B1 4/2013
KR 1020160149922 A 12/2016

OTHER PUBLICATIONS

International Search Report issued in corresponding for Application No. PCT/KR2018/015098, dated Jun. 17, 2019, 2 pages.

* cited by examiner

[FIG. 1]
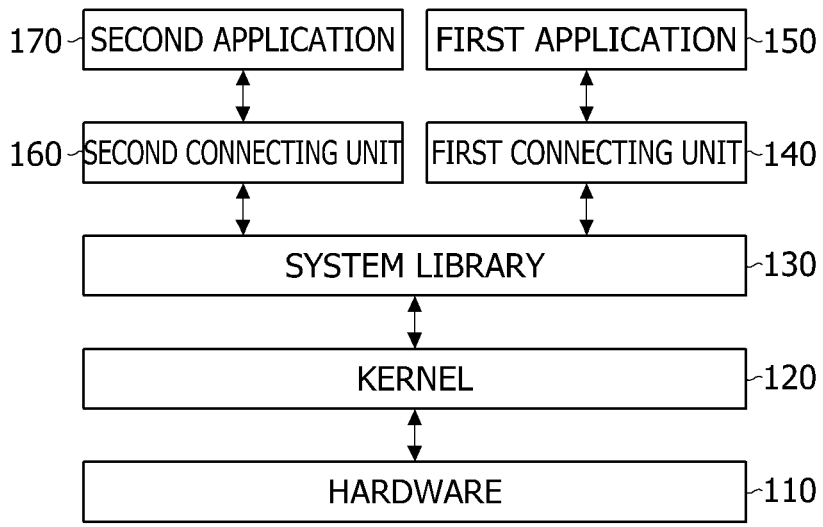
[FIG. 2]
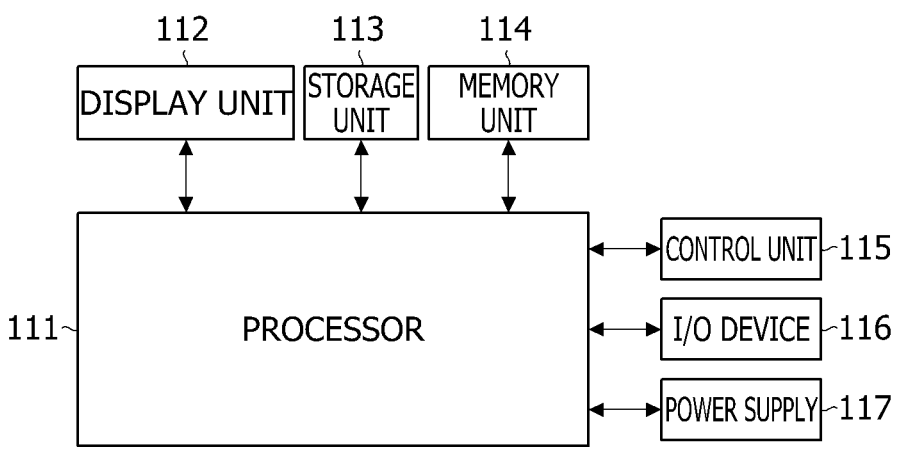

【FIG. 3】
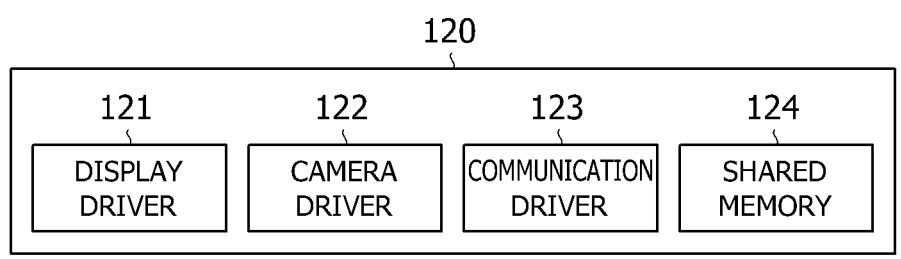
【FIG. 4】
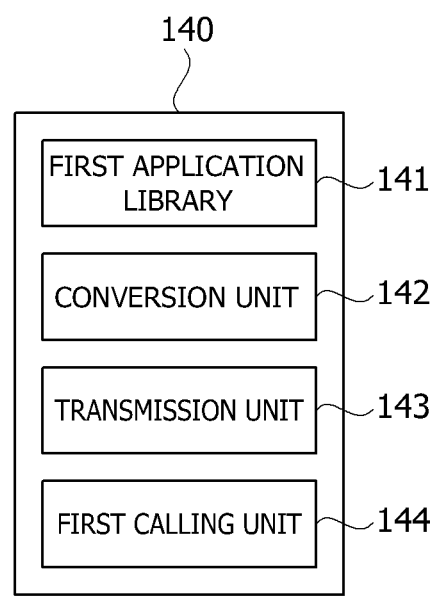

【FIG. 5】
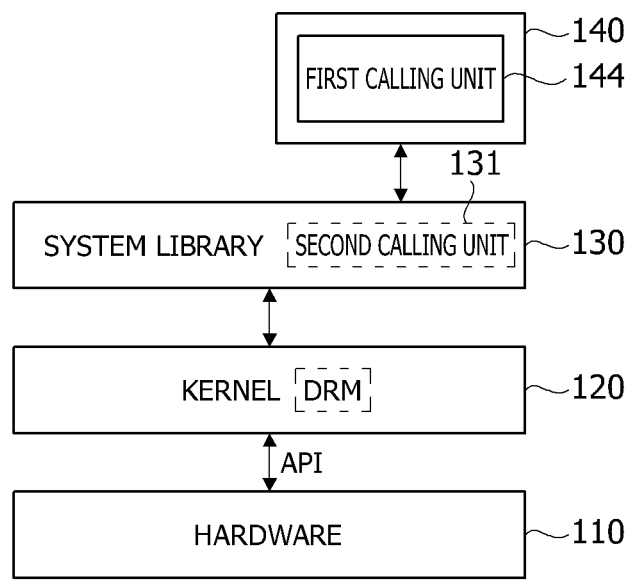
【FIG. 6】
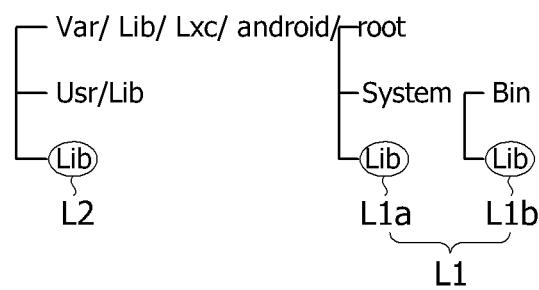

【FIG. 7】
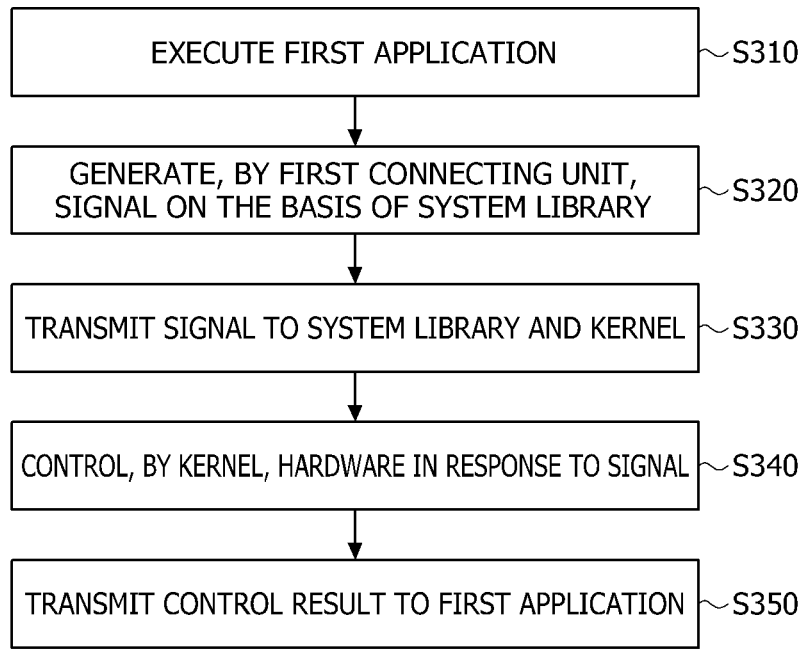
【FIG. 8】
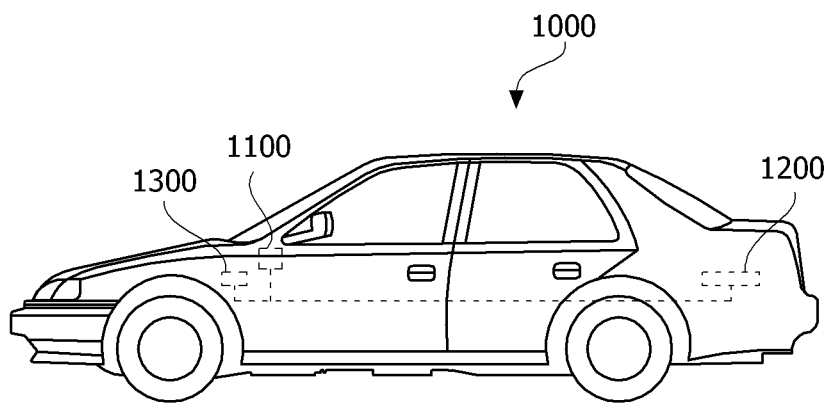

[FIG. 9]
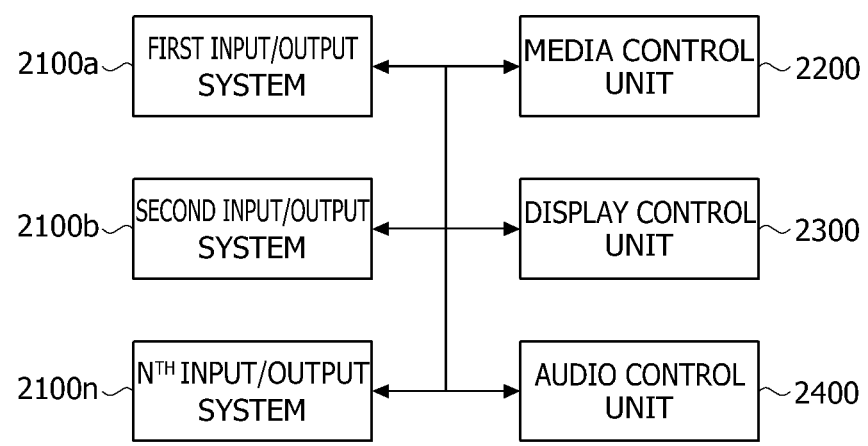

VEHICLE SOFTWARE CONTROL DEVICE

TECHNICAL FIELD

Embodiments of the present disclosure relate to a vehicle software control device.

BACKGROUND ART

Vehicles are gradually moving to a higher level of computerization. Most vehicle tasks, functions, and tasks are currently under computer control or can be monitored by a computing device. As a digital age is emerging, consumers require similarity between a mobile phone and a tablet computer.

For example, General Motors Company and Ford Motor Company are developing vehicle infotainment systems with more dynamic user interfaces. For example, in a Cadillac infotainment system, Cadillac User Experience (CUE™), a vehicle infotainment system having an intelligent user interface with touch and haptic feedback, natural language voice interaction, proximity detection, and buttons and controls is integrated, and thus more in-vehicle information, communication navigation, and entertainment are integrated and simplified and are adjusted for driving use. Ford Motor Company has developed a SYNC™ system and a MYFORD™ system, which provide similar functionality to the CUE™, and vehicle application storage for games and other types of applications. The MYFORD™ system provides an open architecture that allows developers to develop software in which custom displays can be executed on web-based cars.

However, carmakers may have limitations in integrating passenger's personal electronic devices such as smart phones, tablet computers, and laptop computers with in-vehicle computing systems.

DISCLOSURE

Technical Problem

Embodiments of the present disclosure are directed to providing a vehicle software control device in which a first application executed on a different operating system is utilizable.

Further, embodiments of the present disclosure are directed to providing a vehicle software control device in which a first application is executable without any performance degradation.

It should be noted that objects of the present disclosure are not limited to the above-described objects, and other objects of the present disclosure will be apparent to those skilled in the art from the following descriptions.

Technical Solution

One aspect of the present disclosure provides a vehicle software control device which includes hardware, a kernel connected to the hardware and configured to execute a first operating system, a system library connected to the kernel, a first connecting unit configured to connect a library for a second operating system different from the first operating system to the system library, and a first application executed on the second operating system.

The first connecting unit may include a first calling unit which opens a driver in the system library, and the system library may include a second calling unit which opens a device driver in the kernel which performs the same function as that of the driver in the system library.

The first calling unit and the second calling unit may include a hardware abstraction layer.

The kernel may use a hardware driver opened by the second calling unit to perform a call for accessing the hardware through an application program interface (API).

The vehicle software control device may further include a first application library including a library for executing the first application, a conversion unit configured to convert the library for executing the first application so as to interface with the library of the system library, and a transmission unit configured to transmit the converted library to the system library.

A system file of the first connecting unit may include the same path information as that of a system file of the kernel.

The kernel may provide a control signal to the hardware.

The kernel may be a Linux-based kernel.

The first operating system and the second operating system may be Linux-based operating systems.

The hardware may include a control unit and a sensor of a vehicle.

Advantageous Effects

According to the embodiments, a vehicle software control device executed on a different operating system can be implemented.

Further, it is possible to provide improved compatibility which is applicable to all operating systems even when versions of the operating systems applied to hardware vendors are different.

Furthermore, it is possible to manufacture a vehicle software control device in which an application is executable without any performance degradation and which includes a vehicle infotainment system.

Various and advantageous advantages and effects of the present disclosure are not limited to the above descriptions and can be more easily understood in describing a specific embodiment of the present disclosure.

DESCRIPTION OF DRAWINGS

FIG. 1 is a conceptual diagram showing a vehicle software control device according to an embodiment.

FIG. 2 is a conceptual diagram of hardware according to the embodiment.

FIG. 3 is a conceptual diagram of a kernel according to the embodiment.

FIG. 4 is a conceptual diagram of a first connecting unit according to the embodiment.

FIG. 5 is a diagram for describing an operation of a first calling unit according to the embodiment.

FIG. 6 is a diagram for describing system files of the first connecting unit according to the embodiment.

FIG. 7 is a flowchart of a first application control method of the vehicle software control device according to the embodiment.

FIG. 8 is a view showing a vehicle including the vehicle software control device according to the embodiment.

FIG. 9 is a diagram for describing an infotainment vehicle software control device.

MODES OF THE INVENTION

While the present disclosure is susceptible to various modifications and alternative forms, specific embodiments thereof are shown by way of example in the drawings and will herein be described in detail. However, it should be understood that there is no intent to limit the present disclosure to the particular forms disclosed, and on the contrary, the present disclosure is to cover all modifications, equivalents, and alternatives falling within the spirit and scope of the present disclosure.

It should be understood that, although the terms "first," "second," etc. may be used herein to describe various elements, these elements are not to be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a" and "an" are intended to include the plural forms as well unless the context clearly indicates otherwise. It should be further understood that the terms "comprise," "comprising," "include," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments will be described in detail with reference to the accompanying drawings, the same or corresponding components are denoted by the same reference numerals regardless of reference numbers, and thus the description thereof will not be repeated.

Embodiments of the present disclosure relate to a vehicle software control device for vehicle infotainment and provide a system environment coupled to the vehicle infotainment in utilizing applications ('apps' in the same sense) such as smartphone applications. However, the scope of the present disclosure is not limited to the embodiments of the present disclosure.

FIG. 1 is a conceptual diagram showing a vehicle software control device according to an embodiment, FIG. 2 is a conceptual diagram of hardware according to the embodiment, FIG. 3 is a conceptual diagram of a kernel according to the embodiment, FIG. 4 is a conceptual diagram of a first connecting unit according to the embodiment, FIG. 5 is a diagram for describing an operation of a first calling unit according to the embodiment, and FIG. 6 is a diagram for describing system files of the first connecting unit according to the embodiment.

Referring to FIG. 1, a vehicle software control device 10 according to the embodiment may include a vehicle infotainment system. The vehicle software control device 10 may include a vehicle console operating system associated with the user's usage, a mobile operating system associated with the user's usage in a mobile environment, and a terminal environment associated with the user's usage in the mobile environment. A plurality of applications may be executed simultaneously and independently on a kernel.

In particular, the vehicle software control device 10 according to the embodiment may include hardware 110, a kernel 120, a system library 130, a first connecting unit 140, a first application 150, a second connecting unit 160, and a second application 170.

Referring to FIG. 2, the hardware 110 may include an exemplary architectural configuration of the hardware 110 of the vehicle software control device 10 according to the embodiment. Generally, the hardware 110 may include a processor 111, a display unit 112, a storage unit 113, a memory unit 114, a control unit 115, and an input-and-output (I/O) device 116.

The processor 111 may be a vehicle infotainment-based processor 111. For example, the processor 111 may include an Advanced reduced instruction set computer (RISC) Machine (ARM)-based processor 111 such as a Texas Instruments OMAP3430, a Marvell PXA320, a Freescale iMX51, or a Qualcomm QSD8650/8250. Further, the processor 111 may be, for example, another appropriate ARM-based processor 111 on the basis of architecture of an x86-based processor 111 or architecture of another processor 111 such as architecture of another RISC-based processor 111. However, the present disclosure is not limited thereto, and the processor 111 may include various processing devices for performing control.

The display unit 112 may be a touch screen display. Further, an application executed on the vehicle may be controlled by a graphic user interface (GUI) implemented by the display unit.

The storage unit 113 may store system files and the like, and the memory unit 114 may process and store predetermined files and information on control signals.

The control unit 115 may control various devices or components in the vehicle. For example, the touch screen display may be controlled by the control unit 115.

The I/O device 116 may include ports (not shown) or buttons (not shown) and other user interface components that can be employed in the vehicle software control device 10. For example, the buttons may include a click wheel, a scroll wheel, a QWERTY keyboard, and the like. Further, the other user interface components may include Global Positioning System (GPS) devices, local area network (LAN) connectivity, microphones, speakers, cameras, accelerometers, Memory Stick (MS)/MultiMediaCard (MMC)/Secure Digital (SD)/Secure Digital Input Output (SDIO) card interfaces, and the like. However, the present disclosure is not limited thereto.

In addition, the hardware 110 may include a power supply 117 and various interface components such as a communication device and the like in addition to the above components. For example, the power supply 117 may be connected to a battery. Accordingly, the power supply 117 may receive information on an electrical state and the like from the battery. In such a configuration, the power supply 117 may manage a power source of the vehicle software control device 10.

Referring to FIG. 3, the kernel 120 may be connected to the hardware 110 to provide control signals to the hardware 110. The kernel 120 is a region for managing and controlling most basic functions of the devices which provide functions such as interrupt processing, process management, memory management, file system management, and programming interface. Generally, the kernel 120 may be loaded into an inaccessible memory and may be regarded as a type of application program interface (API) for controlling hardware. The hardware 110 may perform functions in response to the control signals received from the kernel 120.

In the vehicle software control device 10, the kernel 120 may execute an operating system. That is, the operating system may be executed on the kernel 120. In particular, the operating system may be a manager applied to the vehicle software control device 10 via an interface with the hardware 110 through the kernel 120. For example, in a laptop computer, an operating system may include Linux, Mac OS X, or Windows 7. In addition, a mobile operating system may include Android, Apple iOS (for iPhone and iPad), Microsoft Windows Mobile (replaced with Windows Phone 7), Nokia Symbian, or Palm OS (replaced with HP webOS). Here, the kernel 120 will be described below on the assumption that tasks are performed by Linux.

The vehicle software control device 10 may request the kernel 120 so that the kernel 120 may manage central processing unit (CPU) scheduling of the operating system, memory access, and computer resources, such as I/O, of the hardware 110. Further, the operating system may be an operating system of the vehicle infotainment. For example, the operating system may be any one of QNX, GENIVI, and Automotive Grade Linux (AGL), but the present disclosure is not limited thereto.

Further, the operating system may perform system calls through the kernel 120 interface without a virtual memory or I/O access by virtualization even when the hardware 110 is not present. However, the present disclosure is not limited thereto.

Further, in an embodiment, the kernel 120 may be a Linux-based Android kernel. The Android kernel may include a display driver 121, a camera driver 122, a communication driver 123, and a shared memory 124. For example, the communication driver 123 may include a Wi-Fi driver and a Bluetooth driver.

In an embodiment, the kernel 120 may include a Direct Rendering Manager (DRM) as the display driver 121. The display driver 121 may be a kernel driver for controlling graphics hardware with a subsystem of the Linux-based kernel because the display driver 121 enables graphics processing unit (GPU) access. Further, the display driver 121 may control display control and GPU control together through the DRM.

The kernel 120 may initialize the driver for the hardware 110 device. In this case, the kernel 120 may initialize memory protection, virtual memory modules, and schedule caching. Further, the kernel 120 may initialize the operating system. In an embodiment, the kernel 120 may execute processes of the vehicle software control device 10 to read configuration files describing system services and additional system parameters for the Android-based operating system.

Further, the kernel 120 according to the embodiment may simultaneously or independently execute the Android-based first application 150 thereon. Accordingly, an Android application (the first application to be described below) may be executed on the vehicle software control device 10 according to the embodiment.

Further, in an embodiment, the control signals may be provided to the hardware 110 by the first application 150 through the kernel 120 without virtualization. The first application 150 may be displayed on a display of the hardware 110, and a user may access the operating system by performing an input on the display (e.g., a touch on the touch screen). In an embodiment, the user may access the operating system on the kernel 120 using the GUI.

Further, in an embodiment, the kernel 120 may further include kernel features required for the first connecting unit 140 which drives a first operating system. For example, the kernel 120 may include a logger, ashmem, LMK, a binder, a namespace, control groups (cgroups), and the like, which are required for Linux Containers (LXC).

The system library 130 may be positioned on the kernel 120 and may finally provide a request from the first application 150 to the kernel 120. As described above, the kernel 120 may control the hardware 110 by transmitting the request from the first application 150 to the hardware 110. Here, the request which is transmitted to the hardware 110 by the kernel 120 may be the above-described various control signals.

However, the operating system executed on the kernel 120 of the vehicle software control device 10 may differ from an operating system of the laptop computer or a mobile operating system due to a different environment of the first application 150 executed on each system. Accordingly, there may be a limitation that the first application 150 executed on the mobile operating system is executed on the vehicle software control device 10.

Referring to FIGS. 4 and 5, the first connecting unit 140 of the vehicle software control device 10 according to the embodiment may include a first application library 141, a conversion unit 142, a transmission unit 143, and a first calling unit 144.

The first application library 141 may include a library necessary for execution of the first application 150. When the first application 150 is executed, the necessary library may be called. For example, the first application library 141 may implement common functions such as I/O and string manipulation (e.g., "C library"), graphics library, database library, communication library, and other libraries for the executed first application 150. The first application library 141 may provide the called library to the conversion unit 142.

The conversion unit 142 may receive the called library and convert the received library so as to interface with the system library 130.

For example, the conversion unit 142 may convert the called library on the basis of the system library 130 of the vehicle software control device 10. The operating system of the vehicle software control device 10 and the operating system in which the first application 150 is executable may be Linux-based operating systems.

For example, when the first application 150 is executed on Google's Android operating system, Android based on Linux may require modifications to the vehicle software control device 10 environment (the system library 130) and the kernel 120. As described above, the vehicle software control device 10 may use the Linux-based kernel 120.

As described above, the Linux-based kernel may be designed with the processor 111 different from the Android-based kernel, but the Linux-based kernel may be the same as the Android kernel in that the kernel is designed based on Linux. Accordingly, the conversion unit 142 may convert the first application 150 executed on the Android-based kernel into the system library 130 of the vehicle software control device 10 such that the first application 150 executed on the Android-based kernel acts on the hardware 110 including a touch screen, a mobile connection (Global System for Mobile Communications (GSM)/Enhanced Data rates for GSM Evolution (EDGE), code division multiple access (CDMA), Wi-Fi, etc.) module, a battery management module, a GPS module, an accelerometer, and a camera module.

In addition, the library converted by the conversion unit 142 may be transmitted to the hardware 110 through the system library 130 and the kernel 120 as a control request. The hardware 110 may be controlled in response to the control request.

The kernel 120 may receive a control result from the hardware 110 and transmit the control result to the system library 130. A library for the control result transmitted to the system library 130 may be transmitted to the transmission unit 143. The transmission unit 143 may transmit the library for the control result to the conversion unit 142, and the conversion unit 142 may match the transmitted library for the control result with the first application library 141 and convert the library. That is, the library for the control result may be converted so as to match the interface of the first application library 141, and the control result for the hardware 110 may be transmitted to the first application 150 and provided to the user on the display.

The transmission unit 143 may transmit the converted library to the system library 130. Further, the transmission unit 143 may receive the library for the control result as described above.

Therefore, the vehicle software control device 10 according to the embodiment may execute the first application 150 without a virtual machine between the operating system of the first application 150 and the operating system of the vehicle software control device 10 in which a difference is present in the kernel 120 and may control the hardware 110 of the vehicle software control device 10.

Accordingly, the vehicle software control device 10 according to the embodiment may include the first connecting unit 140 which is executed on the kernel 120 and the system library 130 with a second operating system different from the first operating system even when the kernel 120 is executed by the first operating system (Linux). Accordingly, the vehicle software control device 10 according to the embodiment may be deployed on Linux systems without generating multiple partitions and may provide improved flexibility and stability on Android devices. In addition, the vehicle software control device 10 according to the embodiment may include the second connecting unit 160 and the second application 170, which are executed on the first operating system (Linux) which will be described below and may perform various operations by default for the second connecting unit 160 and the second application 170. Accordingly, since the vehicle software control device 10 according to the embodiment uses the first operating system, which is Linux, a booting speed thereof may be improved as compared with a system which uses the second operating system, and utilization as an open source may also be significantly increased.

Further, the vehicle software control device 10 according to the embodiment is not driven on the system library 130 by a virtual machine or a hypervisor through the first connecting unit 140. The virtual machine or the hypervisor may be directly driven on the hardware 110 and may be executed through the individual kernel 120 of the operating system.

For example, since the hypervisor or the virtual machine effectively generates multiple virtual computers in one device, each operating system may have a separate virtual computer. Therefore, multiple operating systems which are executed on one device through the hypervisor and the virtual machine may be executed on a guest operating system rather than the kernel 120 of the vehicle software control device 10. Therefore, system overhead may be added for each operating system because the operating system is executed by virtualization. Further, since a CPU and other computing resources have to be allocated to the hypervisor, there is a problem in that each operating system cannot effectively schedule processes and tasks. Accordingly, the vehicle software control device 10 according to the embodiment may effectively perform the processes and tasks with system performance as it is without virtualization of the hardware 110 resources, and the processes and tasks may be executed on the kernel 120 of the vehicle software control device 10.

The first calling unit 144 may call the system library 130 rather than the kernel 120. In an embodiment, the first calling unit 144 may be positioned in the system library that causes the second operating system to be implemented and operated. The first calling unit 144 may first call the system library 130 rather than the kernel 120. In other words, the first calling unit 144 that causes the second operating system to be implemented and operated may call the system library 130 that causes the first operating system different from the second operating system to be implemented and operated. The second calling unit 131 in the system library 130 may call the kernel 120. Therefore, the kernel 120 may use the called driver (e.g., the hardware driver) to perform a call for accessing a corresponding device in the hardware 110 through an application program interface (API) such as the hardware driver and the like. Here, the corresponding device in the hardware 110 may be the same as the device in the hardware driver, which is called through the kernel 120.

In an embodiment, the first calling unit 144 may call the system library 130 rather than the kernel 120 in the system library of the Android operating system and then the system library 130 may call the kernel 120 so that device access may be allowed. In such a configuration, the vehicle software control device 10 according to the embodiment may easily access the hardware changed only by modification of the system library 130 without changing the system library on the second operating system in the first connecting unit 140 even when the hardware 110 is changed. Further, the vehicle software control device 10 according to the embodiment may access each hardware component even when various chip manufacturers provide a hardware dependent library only in a predetermined operating system version, and thus improved compatibility may be provided. That is, the vehicle software control device 10 may be independent of a type or version of the operating system.

More specifically, in a system architecture in which a host operating system (here, which corresponds to the first operating system) is the same as a sub operating system (here, which corresponds to the second operating system and is present on, for example, a container), a system library of the host operating system may be the same as a system library of the sub operating system so that device access may be made as if the kernel 120 is shared. However, in the embodiment, since a system architecture in which a host operating system and a sub operating system have different operating systems (the first operating system and the second operating system, respectively) is provided, a system library (which corresponds to the system library 130) of the host operating system may be different from a system library (which corresponds to the system library in the connecting unit) of the sub operating system. In this case, the first calling unit 144 in the system library of the sub operating system may call the system library of the host operating system so that access to the hardware may be performed.

When the first calling unit 144 transmits the control signal to the kernel 120, the first calling unit 144 may call the system library 130 before opening various device drivers (the display driver, the camera driver, and the like) in the kernel 120 described above. That is, a call signal may be primarily provided to the system library 130 by a call, and the second calling unit 131 in the system library 130 may re-open the device driver in the kernel 120 in response to the call signal. That is, the second calling unit 131 may open the device driver in the kernel 120 having the same function as that of the open device driver. The second calling unit 131 may perform the call by the system library in the second connecting unit 160 as well as the call by the first calling unit 144.

In the above-described manner, the kernel 120 may receive control information from the first connecting unit 140. In addition, even when the kernel 120 receives an event input through the hardware, the order is reversed and the rest is performed in the same manner.

Further, the first calling unit 144 and the second calling unit 131 may include a hardware abstraction layer (HAL). Accordingly, the first calling unit 144 and the second calling unit 131 may be composed of a plurality of library modules.

Referring to FIG. 6, booting may be performed in the kernel 120 of the embodiment. That is, kernel information may be loaded into a memory, and system control authority may be transferred to the kernel. Further, the kernel 120 may initiate an operation of the first operating system (e.g., Linux) and check the hardware 110. A first process may be executed by the kernel. In this case, the first connecting unit 140 according to the embodiment may add a path of the system file in the kernel 120 described above to a path of the system file in the second operating system. That is, the system file of the first connecting unit 140 may include a path of the system file for the first operating system.

In an embodiment, a system file L1 in the first connecting unit 140 may include the same information as that of the system file in the kernel 120. For example, a library file L1 in the first connecting unit 140 may include a library file L1*a* which is applicable to the second operating system and a library file L1*b* which is the same as a library file L2 in the kernel 120.

Referring again to FIG. 1, the second connecting unit 160 may be executed based on the first operating system. In an embodiment, the second connecting unit 160 may be AGL. The second connecting unit 160 may include an AGL service and an AGL framework. Further, the AGL service may include various services, such as a network for controlling network functions, graphics for controlling display-related functions, a resource manager for controlling resource-related functions, an audio for controlling audio-related functions, telematics for controlling communication-related functions, a smartphone link for controlling connection functions with a smartphone, and the like.

Further, the AGL framework may include managers, such as an application manager for managing a life cycle of an application (second application which will be described below) executed on the AGL, a window manager for managing a screen display layout of the second application on the AGL, an input manager for managing a portion received from the second application, a policy manager for managing information and resources of the second applications, a user manager for managing multi-user functions, a sound manager for managing audio-related functions, and the like.

The second application 170 may include various applications executed on the second connecting unit 160. For example, the second application 170 may include a media player, which is a media playback application, a web browser, and an Android container monitoring server and agent, which is a container management application. The second application 170 may be executed on the first operating system, for example, Linux, as described above.

FIG. 7 is a flowchart of a first application control method of the vehicle software control device according to the embodiment.

Referring to FIG. 7, the first application control method of the vehicle software control device according to the embodiment may include executing the first application (S310), generating, by the first connecting unit, a signal on the basis of the system library (S320), transmitting the signal to the system library and the kernel (S330), controlling, by the kernel, the hardware in response to the signal (S340), and transmitting a control result to the first application (S350).

As described above, the first application may be executed by a user. For example, the first application may be a mobile app. The first application may be executed on an Android operating system.

The first connecting unit may generate a signal after the execution of the first application. The signal may be a signal for controlling a device of the hardware. Specifically, a corresponding request may be transmitted to the first connecting unit due to the execution of the first application. The first connecting unit may call the first application library in response to a request of the first application as described above. Therefore, the first application library may provide a called library including a character string, etc. to the conversion unit.

The conversion unit may receive the called library to convert the received library so as to interface with the system library of the vehicle software control device, and the transmission unit may transmit the converted library to the system library. The first calling unit may call the second calling unit so as to open a corresponding hardware driver with the system library and finally provide an interface to easily manipulate each hardware component in the kernel.

The converted library may be converted into a signal suitable for the operating system of the vehicle software control device in the system library and transmitted to the kernel. The kernel may control the hardware in response to the signal.

The kernel may receive the control result from the hardware and transmit the control result to the system library. A library for the control result transmitted to the system library may be transmitted to the transmission unit. The transmission unit may transmit the library for the control result to the conversion unit, and the conversion unit may match the transmitted library for the control result with the first application library and convert the library.

FIG. 8 is a view showing a vehicle including the vehicle software control device according to the embodiment.

Referring to FIG. 8, the vehicle may include vehicle components 1100, a processing module 1200, and a bus 1300.

The vehicle component 1100 may be an exemplary configuration connected to the bus 1300.

For example, the vehicle 1000 includes wheels, a power source, a steering wheel, a display panel (e.g., an instrument panel), and a passenger seat system.

The vehicle components 1100 of the vehicle 1000 may include a wireless signal receiver and a satellite positioning system receiver (e.g., a GPS), a Global Navigation Satellite System (GLONASS, Russia), a Galileo Positioning System (EU), a Compass navigation system (China), and a Regional Navigational Satellite System (India).

Further, the vehicle 1000 includes a plurality of control units and sensors as the vehicle components 1100. For example, the control units and the sensors may sense vehicle speed, acceleration, deceleration, wheel rotation, wheel speed (e.g., revolutions per minute of the vehicle wheel), wheel slip, and the like.

Further, the control units and the sensors may include a power controller and an energy output sensor. The control units and the sensors may control balance of fuel (e.g., Gasoline, natural gas or other mixture) or measure one or more of energy input and output (e.g., a voltage, a current, fuel consumption, and torque).

Further, the vehicle components 1100 may include a transmission control unit. The transmission control unit may control a current state of a transmission (e.g., gear selection or setting).

The control units and the sensors may include an airbag system for safety. The airbag system may include an airbag control unit and a collision sensor. When collision is detected by the collision sensor, detected data may be transmitted to an airbag release control unit, and the airbag release control unit may determine whether the airbag is inflated based on the data reception. In addition, safety components may include a seat belt control device, a headlight control device, a camera, or other image sensor, but the present disclosure is not limited thereto.

Further, the vehicle components 1100 may provide entertainment options such as music or video for passengers.

The processing module 1200 may monitor or control the sensors and the control units described above. (e.g., an engine, a transmission, a towing and safety control module, a parallel parking assistance system, an occupant protection system, a power steering assistance device, a self-diagnostic device, an event data recording device, a steer by telematics module, a navigation, a multimedia system, an audio system, a rear seat entertainment system, a vehicle and other vehicle software control device, a vehicle and a vehicle interaction module, a vehicle interaction module, a game console, an adaptive cruise control module, an adaptive headlight, a collision warning module, a blind spot intelligent sensor, a parking/stationary module, a tire pressure monitoring module, a dashboard, lighting, seats, a climate control module, a voice recognition module, a remote control module, a security alarm system, and a wiper/window control module)

As described above, the processing module 1200 may be positioned at any position of the vehicle. Further, a plurality of processing modules 1200 may be disposed at any position even when the same sensing function is performed. For example, even when the processing module 1200 for controlling collision with a rear of the vehicle 1000 is damaged, the processing modules 1200 disposed at other positions of the vehicle may not be damaged.

Applications which are accessible through the processing modules 1200 may include, for example, a dial, gauges (e.g., a cyclometer, a speedometer, an oil pressure, an engine temperature, indoor/outdoor temperature, a trip computer, a maintenance tire pressure, vehicle/part performance monitoring, and other vehicle-related detection information), an application associated with a handicap and accessibility graphic user interface (e.g., large fonts, controls, text-to-speech conversion, text interface, voice command interface, etc.), an e-mail client, a web browser, a communication application (e.g., an e-mail application, a text messaging application, a telephony application, etc.), games (e.g., a solo or multi-party game, access to other multimedia files, specifically audio and/or video files, watching, or listening), a satellite positioning system receiver application (e.g., location tracking, vehicle tracking, map applications, medical information applications, and emergency services applications), a noise suppression application, a news-related application, a biometric first application (e.g., an iris recognition system for user identification, etc.), and a travel application.

The bus 1300 may be connected to each of the processing modules 1200. The bus 1300 may include a standardized communication network. The standardized communication network may include Ethernet, Wi-Fi, Universal Serial Bus (USB), Inter-Integrated Circuit (I²C), Recommended Standard 232 (RS232), RS485, and FireWire. For example, the bus 1300 may include and support buses 1300 with a standardized communication network such as a campus area network (CAN).

The vehicle components 1100, the processing module 1200, and the bus 1300 of the vehicle 1000 which are described above may be included in the hardware of the vehicle software control device described above. Therefore, the vehicle components 1100, the processing module 1200, and the bus 1300 of the vehicle 1000 may operate in response to a request by the first application.

FIG. 9 is a diagram for describing an infotainment vehicle software control device.

Referring to FIG. 9, the vehicle infotainment system may include a plurality of I/O systems 2100a, 2100b, and 2100n and may receive user input from a media control unit 2200, a display control unit 2300, and an audio control unit 2400 around the user and provide an output corresponding to the input using the plurality of I/O systems 2100a, 2100b, and 2100n.

For example, when the user receives an input for voice control through the plurality of I/O systems 2100a, 2100b, and 2100n by executing the first application, a voice output corresponding to the input may be provided to the user. Further, the voice output through the application may be streamed to a speaker among the vehicle components or transmitted to an interface selected by the user.

The vehicle software control device described in the present embodiment may be implemented as a computer program stored in a computer-executable storage medium. Moreover, terms described in the specification such as "unit" refer to software or a hardware component such as a field-programmable gate array (FPGA) or an Application-Specific Integrated Circuit (ASIC), and the unit performs certain functions. However, the "unit" is not limited to software or hardware. The "unit" may be configured in a storage medium that may be addressed or may be configured to be executed by at least one processor. Therefore, examples of the "unit" include components such as software components, object-oriented software components, class components and task components, and processes, functions, attributes, procedures, subroutines, segments of program codes, drivers, firmware, micro codes, circuits, data, database, data structures, tables, arrays, and variables. Components and functions provided from "units" may be combined into a smaller number of components and "units" or may be further separated into additional components and "units." In addition, the components and the "units" may be implemented to playback one or more CPUs in a device or a secure multimedia card.

While the present disclosure has been particularly described with reference to embodiments, the embodiments are only exemplary embodiments of the present disclosure and the present disclosure is not intended to be limited thereto. It will be understood by those skilled in the art that modifications and applications in other forms may be made without departing from the spirit and scope of the present disclosure. For example, each component specifically shown in the embodiments may be modified and embodied. In addition, it should be understood that differences related to these modifications and applications are within the scope of the present disclosure as defined in the appended claims.

The invention claimed is:

1. A method for controlling a vehicle comprising: generating a signal after an execution of a first application operated on a sub operating system, wherein the signal controls a hardware; calling a first application library of the sub operating system in response to the signal; converting the called library to interface with a system library of a host operating system; and transmitting the converted library to the host operating system so that a kernel controls the hardware; wherein the sub operating system is different from the host operating system, wherein the first application library includes a library for executing the first application, wherein the kernel is connected to the hardware and configured to execute the host operating system, and wherein the first application library has a first library file which is applicable to the sub operating system and a second library file which is the same as the system library on the kernel in the host operating system;

wherein the kernel is a Linux-based kernel.

2. The method for controlling a vehicle of claim 1, wherein the second library file has the same path information as the system library.

3. A non-transitory computer-executable storage medium comprising one or more computer- executable instructions that, when executed by at least one processor of a computing device, cause the computing device to control a vehicle comprising:

generate a signal after an execution of a first application operated on a sub operating system, wherein the signal controls a hardware; call a first application library of the sub operating system in response to the signal; convert the called library to interface with a system library of a host operating system; and transmit the converted library to the host operating system so that a kernel controls the hardware; wherein the sub operating system is different from the host operating system, wherein the first application library includes a library for executing the first application, wherein the kernel is connected to the hardware and configured to execute the host operating system, and wherein the sub operating system has a first library file which is applicable to the sub operating system and a second library file which is the same as the system library on the kernel in the host operating system;

wherein the kernel is a Linux-based kernel.

* * * * *